United States Patent [19]

Wortman

[11] Patent Number: 5,363,470
[45] Date of Patent: Nov. 8, 1994

[54] DISPLACING AN OPTICAL LIGHTING FILM'S LINEAR ARRAY OF GROOVES TO FACILITATE EMISSION OF LIGHT

[75] Inventor: David L. Wortman, St. Paul, Minn.

[73] Assignee: Minnesota Mining and Manufacturing Company, Saint Paul, Minn.

[21] Appl. No.: 89,288

[22] Filed: Jul. 8, 1993

[51] Int. Cl.⁵ .............................................. G02B 6/20
[52] U.S. Cl. ................................. 385/147; 385/133; 385/901; 362/32
[58] Field of Search .................... 385/133, 147, 901; 359/592, 599; 362/32, 339

[56] References Cited

U.S. PATENT DOCUMENTS

| | | | |
|---|---|---|---|
| 4,260,220 | 4/1981 | Whitehead | 385/133 |
| 4,615,579 | 10/1986 | Whitehead | 385/133 |
| 4,750,798 | 6/1988 | Whitehead | 385/133 |
| 4,787,708 | 11/1988 | Whitehead | 385/133 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 4,906,070 | 3/1990 | Cobb, Jr. | 350/286 |
| 4,912,605 | 3/1990 | Whitehead | 362/32 |
| 4,996,632 | 2/1991 | Aikens | 362/32 |
| 5,040,883 | 8/1991 | Cobb, Jr. | 350/452 |
| 5,043,850 | 8/1991 | Dreyer, Jr. | 362/26 |
| 5,056,892 | 10/1991 | Cobb, Jr. | 359/831 |
| 5,095,415 | 3/1992 | Anderson et al. | 362/329 |
| 5,117,478 | 5/1992 | Cobb, Jr. et al. | 385/133 |

*Primary Examiner*—John D. Lee
*Assistant Examiner*—Phan Thi Heartney
*Attorney, Agent, or Firm*—Gary L. Griswold; Walter N. Kirn; Michael K. Ouyang

[57] ABSTRACT

The present invention provides an apparatus for transporting and distributing light. The apparatus comprises a longitudinal, hollow light conduit with a linear array of prisms arranged side-by-side to form grooves, the grooves disposed in a non-parallel orientation with respect to the longitudinal axis of the light conduit. The non-parallel orientation of the grooves causes some, or all, light which would otherwise be totally internally reflected within the light conduit to be emitted from the light conduit.

7 Claims, 3 Drawing Sheets

DISPLACING AN OPTICAL LIGHTING FILM'S LINEAR ARRAY OF GROOVES TO FACILITATE EMISSION OF LIGHT

FIELD OF THE INVENTION

The present invention generally relates to a light conduit for transporting and distributing light. Specifically, the present invention relates to a longitudinal, hollow light conduit of a transparent material having a structured surface on one side and a smooth surface opposite the structured surface, the structured surface forming grooves which are disposed in a non-parallel orientation with respect to the longitudinal axis of the light conduit, the non-parallel grooves facilitating the emission of light from the light conduit.

BACKGROUND OF THE INVENTION

Optical light guides made of a transparent material having substantially planar inner surfaces and outer surfaces which are "in octature" have been utilized to transport light, as illustrated in U.S. Pat. No. 4,260,220 to Whitehead. These devices are typically constructed of an optical lighting film made of flexible polymeric sheets of a transparent material having a structured surface on one side and a smooth surface opposite the structured surface. The structured surface of the devices preferably include a linear array of miniature substantially right angled isosceles prisms arranged side-by-side to form a plurality of peaks and grooves. Further, the perpendicular sides of the prisms make an angle of approximately 45 degrees with the smooth surface. This structure of the polymeric sheets, as well as the shape of the light conduit, enables light to be constrained to travel through the light conduit without escaping through its walls if the angle by which the light rays deviate from the longitudinal axis of the light conduit does not exceed a maximum angle, or critical angle, which depends upon the refractive index of the light conduit material. Thus, light entering a light conduit at an angle less than this predetermined maximum is totally internally reflected. These light conduits have been constructed in various cross-sections, such as square cross-sections, as illustrated in U.S. Pat. No. 4,260,220, and circular cross-sections, as illustrated in U.S. Pat. No. 4,805,984.

In many applications, it is desirable to make light escape from the light conduit in a controllable manner. Many means for facilitating emission of light from the light conduit have been used in the past. For example, an extractor such as a diffuse scatterer made from a highly reflective white polymeric tape such as SCOTCHCAL ELECTROCUT brand film, manufactured by 3M Company, St. Paul, Minn., may be placed inside a light conduit to increase the rate of leakage, or emission, of the light from inside the light conduit. The diffuse scatterer increases the rate of leakage by "scattering" light that hits it into non-total internal reflecting angular regions of the light conduit, thereby increasing the amount of light in those angles which allow light to be emitted from the light conduit. Typically, a strip of the highly reflective white polymeric tape is placed over the length of the light conduit to cause the scattering. Thus, an additional component, namely the diffuse scatterer, must be added to the light conduit to increase the rate of leakage.

While a diffuse scatterer increases the rate of leakage from inside a light conduit, only light which actually hits the diffuse scatterer will be scattered and thereby increase the rate of leakage. In light conduits with long aspect ratios, that is, for a tubular light conduit with a length much greater that its diameter, the diffuse scatterer may run the entire length of the light conduit. The rate at which the light is emitted from the light conduit is higher in the angular regions of the light conduit where an extractor, such as a diffuse scatterer, is placed than in angular regions of the light conduit where the light is never reflected from the diffuse scatterer. The effectiveness of the diffuse scatterer is reduced as the length of the light conduit increases because after light is emitted out of the light conduit, depleted zones are formed in angular regions associated with the diffuse scatterer and therefore the diffuse scatterer reflects less light. Nonetheless, an extractor allows a greater amount of light to be emitted from the light conduit than a light conduit without an extractor.

Another means for increasing the amount of light emitted from the light conduit is including a non-planar surface, a rough outer surface or round corners in an outer corrugated surface to increase the amount of light emitted from those surfaces, as illustrated in U.S. Pat. No. 4,615,579 to Whitehead.

SUMMARY OF THE INVENTION

To overcome the limitation in the prior art described above, and to overcome other limitations that will become apparent upon reading and understanding the present specification, the present invention provides an optical lighting film light conduit with a linear array of prisms arranged side-by-side to form grooves, the grooves disposed in a non-parallel orientation with respect to the longitudinal axis of the light conduit. In a light conduit with grooves disposed in an orientation parallel to the longitudinal axis of the light conduit, light rays entering the light conduit at an angle less than the critical angle for the optical lighting film, as measured from the longitudinal axis, are totally internally reflected within the light conduit. The non-parallel orientation of the grooves causes some, or all, light which would otherwise be totally internally reflected within the light conduit to fall outside the critical angle, and thereby facilitates increased emission of light from the light conduit. The non-parallel orientation of the grooves further causes light rays entering on a path through the axis of the light conduit to travel in a non-planar path within the light conduit.

In one preferred embodiment of the present invention, a light conduit has a circular cross-section and is in tubular form. The linear array of prisms forms grooves which are disposed in a helical orientation with respect to the longitudinal axis of the light conduit. The plane in which the light rays travel within the light conduit spirals in the same rotational direction as the rotational direction of the spiralled grooves.

In another preferred embodiment of the present invention, a diffuse scatterer is placed on an interior wall of a tubular light conduit, the light conduit having grooves which are disposed in a helical orientation with respect to the longitudinal axis of the light conduit. The diffuse scatterer, in conjunction with the spiralled grooves, increase the intensity of the emitted light along the length of the light conduit.

BRIEF DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
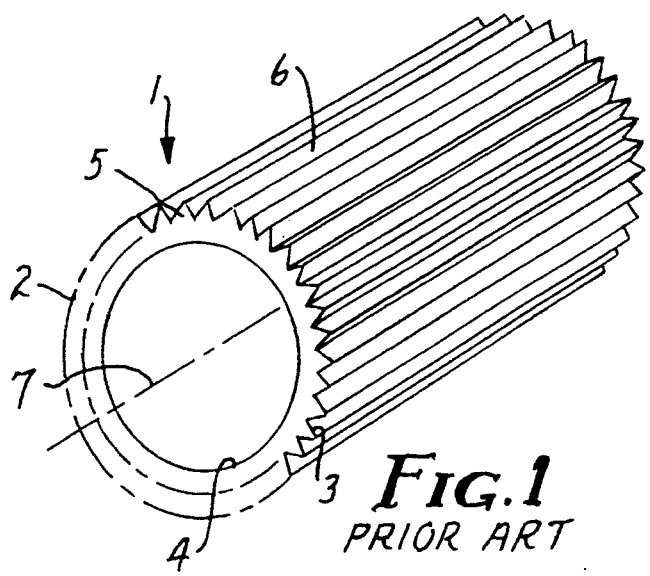
FIG. 1 is an end cross-sectional view of an optical lighting film, conventional light conduit with grooves disposed in a parallel orientation with respect to the longitudinal axis of the light conduit.

Referring to FIG. 1, a longitudinal, hollow light conduit 10 may be used to transport and distribute a predetermined portion of light. The cross-section of light conduit 1 is circular. Light conduit 1 includes a wall member 2, of a transparent material, having a structured surface 3 on one side and a smooth surface 4 opposite the structured surface 3. The transparent material is preferably an optical lighting film such as taught in U.S. Pat. No. 4,906,070 to Cobb, Jr. Structured surface 3 includes a linear array of substantially right angled isosceles prisms 5 arranged side-by-side to form grooves 6, the perpendicular sides of prisms 5 making an angle of approximately 45 degrees with the tangent to smooth surface 4.

Grooves 6 of light conduit 1 are disposed in a parallel orientation with respect to longitudinal axis 7 of light conduit 1. Light which enters light conduit 1 may be transported along the length of the light conduit 1 by total internal reflection. If light enters light conduit 1 within an acceptable angular range, as determined by the refractive index of the transparent material, the light will be totally internally reflected as taught by U.S. Pat. No. 4,805,984 to Cobb Jr. For example, for a transparent material, such as polymethylmethacrylate (acrylic), having a refractive index of 1.493, all incident light rays entering light conduit 1 within an angular range less than 27.3 degrees, as measured from longitudinal axis 7 of light conduit 1, will be totally internally reflected. On the other hand, incident light which enters light conduit 1 outside the critical angle, in the example 27.3 degrees, will be in a non-totally internally reflecting angular region, and will be emitted out of light conduit 1.

Figure 2:
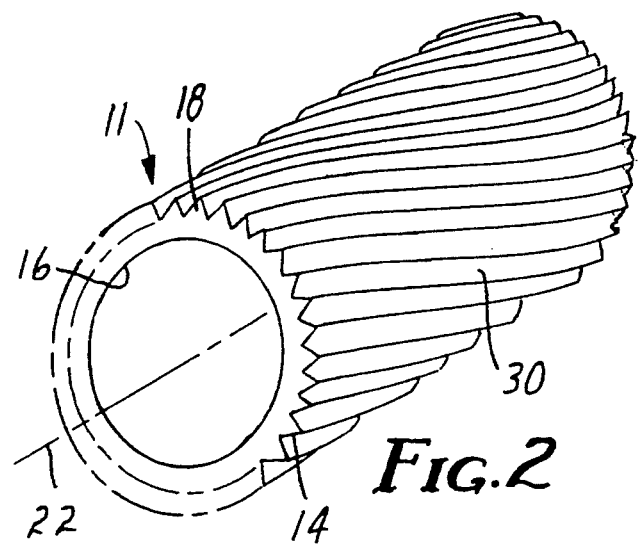
FIG. 2 is an end cross-sectional view of an optical lighting film light conduit with grooves disposed in a helical orientation with respect to the longitudinal axis of the light conduit.
Figure 3:
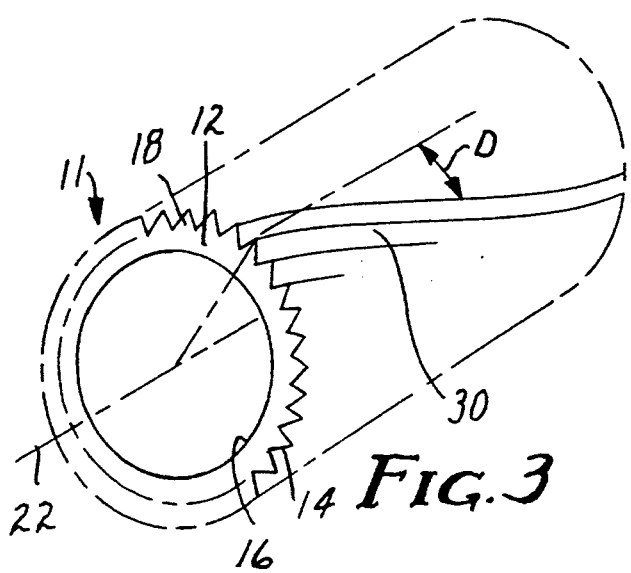
FIG. 3 is an end cross-sectional view of the light conduit of FIG. 2 illustrating the degree of spiral of the grooves of the light conduit.

In many applications, it is desirable for light to emit from the light conduit. Referring to FIG. 2, a preferred embodiment of light conduit 11 has a circular cross-section, although light conduit 11 may have a cross-section of many shapes, for example, square or elliptical. Further, light conduit 11 may only include a portion of the wall member lying in a smooth arcuate curve. Light conduit 11 is also in a tubular and hollow form. Structured surface 14 includes a linear array of substantially right angled prisms 18 arranged side-by-side to form grooves 30, the perpendicular sides of prisms 18 making an angle of approximately 45 degrees with the tangent to smooth surface 16. Grooves 30 are disposed in a non-parallel orientation with respect to longitudinal axis 22 of light conduit 11. Preferably, spiralled grooves 30 are disposed in a substantially helical orientation with respect to longitudinal axis 22 of light conduit 11. In FIG. 3, angle D measures the angle between an orientation of grooves 6 which would be parallel to longitudinal axis 22 of light conduit 11 and the tangent to the point where spiralled grooves 30 and the parallel orientation to longitudinal axis 22 intersect. Angle D, the displacement of spiralled grooves 30 from an orientation parallel to longitudinal axis 22, which thereby defines the degree of spiral, may fall in the range between 1 and 89 degrees.

Placing grooves 30 in a helical orientation around longitudinal axis 22 of light conduit 11 results in prisms 18 also being disposed in a helical orientation around longitudinal axis 22. When light conduit 11 has helically oriented grooves, the light entering light conduit 11 which would otherwise be totally internally reflected if grooves 30 were disposed in a parallel orientation with respect to longitudinal axis 22 might not be totally internally reflected. Whether an incident light ray will be totally internally reflected now depends on the refractive index of the material used to construct wall member 12, the angle at which the light ray enters light conduit 11 as measured from longitudinal axis 22, and angle D. For example, light rays entering a light conduit with a wall member having a refractive index of 1.493 and at an angle less than the critical angle of 27.3 degrees would be totally internally reflected if angle D was zero, or in other words, the grooves were in a parallel orientation to longitudinal axis 22. But as angle D increases from 1 degree towards 89 degrees, the level of light emitted from the light conduit will increase. The level of emitted light increases because as angle D increases, more light rays behave in the same manner as light rays which entered a light conduit with grooves parallel to longitudinal axis 22 at an angle outside the critical angle of 27.3 degrees. Therefore, more light that would otherwise fall into totally internally reflecting angular regions, based on the light rays' angle of entry into the light conduit, will now fall into non-totally internally reflecting angular regions.

Figure 4:
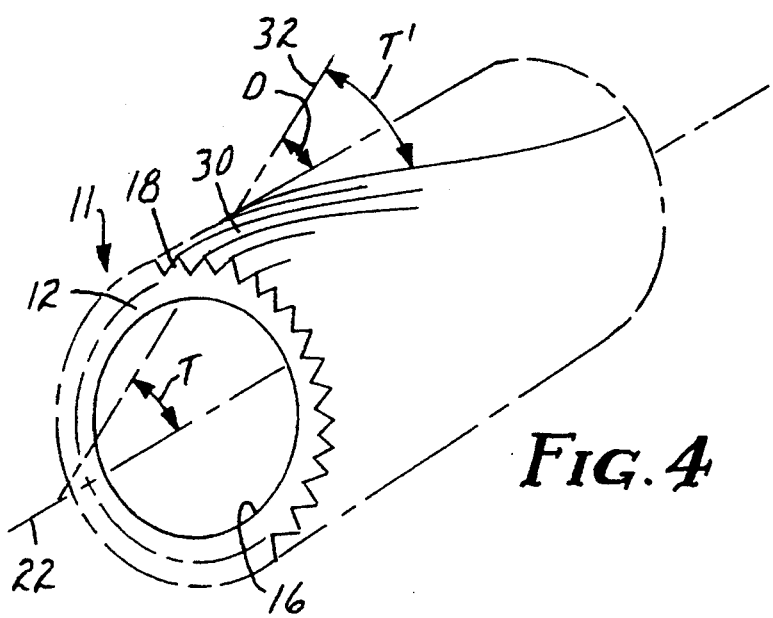
FIG. 4 is a perspective view of the light conduit to illustrate light ray and groove geometry.

The above-mentioned behavior of light rays entering a light conduit with helically oriented grooves will now be more specifically described. Referring to FIG. 4., angle T is the angle that light ray 32 makes with longitudinal axis 22 and angle T' is the angle that light ray 32 makes with groove 30 at wall member 12, or in other words, the angle at which a light ray approaches a groove. In a light conduit with grooves parallel to the longitudinal axis of the light conduit, angle D is zero degrees and angle T' is the same as angle T. In this situation, the behavior of light rays entering the light conduit is as described in U.S. Pat. No. 4,805,984 to Cobb, Jr., which is hereby incorporated by reference.

In a light conduit with grooves oriented helically with respect to the longitudinal axis of the light conduit, angle D will be greater than zero degrees and angle T' will be not be the same as angle T. The relationship of the between the three angles in this situation is $$\cos(T') = \cos(T)\cos(D).$$

Therefore, for a given light source, with a average light ray angle T, a range of groove angles D may be used to calculate a range of T' angles, which would generally describe the angular relationships between the light ray and a groove, as measured at the wall member. More specifically, the range of T' angles would represent the range of angles that a light ray would approach a spiralled groove as a function of the severity of the spiral. For example, for a light source with an average ray angle of 18 degrees:

| T | D | T' |
|---|---|---|
| 18 degrees | 0 degrees | 18 degrees |
|  | 5 | 18.7 |
|  | 7.5 | 19.5 |
|  | 10 | 20.5 |
|  | 20 | 26.7 |
|  | 25 | 30.5 | or, as another example, for a light source with an average ray angle of 27.3 degrees:

| T | D | T' |
|---|---|---|
| 27.3 degrees | 0 degrees | 27.3 degrees |
|  | 5 | 27.7 |
|  | 7.5 | 28.2 |
|  | 10 | 30.9 |
|  | 20 | 33.4 |

For a given light source, the degree of spiral necessary to cause all incident light to be emitted could be determined by setting angle T' equal to the critical angle. Then, a light conduit could be constructed with an angle D anywhere between zero degrees and the angle D which would allow all light, for a particular source, that entered the light conduit to be emitted, depending on how much light desired to be extracted and how much transported. The amount of light emitted by a light conduit will vary with respect to the cutoff angle of the light source, the refractive index of the material used to construct the light conduit as well as the severity of the degree of spiral of the grooves. For example, for an acrylic material having a refractive index of 1.493, the critical angle is 27.3 degrees. For various degrees of spiral, the relationship between the degree of spiral and the maximum light source cutoff angle is as follows:

| T' (critical) | D | T (max) |
|---|---|---|
| 27.3 | 0 | 27.3 |
|  | 5 | 26.9 |
|  | 7.5 | 26.3 |
|  | 10 | 25.5 |
|  | 20 | 19.0 |
|  | 25 | 11.3 |

In this example, the relationship between the degree of spiral and maximum light source cutoff angle shows that a light source with a cutoff angle of 27.3 degrees in a light conduit with parallel grooves, i.e. angle D=0, will behave substantially the same as a light source with a cutoff angle of 11.3 degrees in a light conduit with a 25 degree spiral. A preferred degree of spiral, as defined by angle D, will depend not only on the light source cutoff angle, light conduit material, and length of the light conduit but also on the preferred rate of extraction. To decrease the percentage of light transported, that is, the amount of light that leaves the light conduit as a percentage of the light that entered the light conduit, the degree of spiral could be increased. Similarly, increasing the degree of spiral increases the percentage of exitance, that is, the percentage of light that is extracted from the light conduit over the length of the light conduit. In general, for a standard EXN halogen driven light source and a light conduit length of fifteen light conduit diameters, a preferred range of spiral will depend on the light conduit's use. The following table summarizes some degrees of spiral and the percentage of light that is transported and extracted:

| Degree of spiral | % Transport | % Exitance |
|---|---|---|
| 0 | 82 | 14 |
| 5 | 81 | 15 |
| 7.5 | 76 | 21 |
| 9.9 | 31 | 68 |

For the above light source and light conduit length, a preferred angle D would range between 0–7.5 degrees if the purpose of the use of the light conduit was to maintain transport of light but increase the rate of extraction over a non-spiralled light conduit. To further increase the extraction of light while maintaining some transport of light, a preferred angle D would range between 7.5–10 degrees. If the percentage of light extracted from the light conduit was to remain the same with in increase in the length of the light conduit, the degree of spiral would be lowered accordingly.

Figure 5:
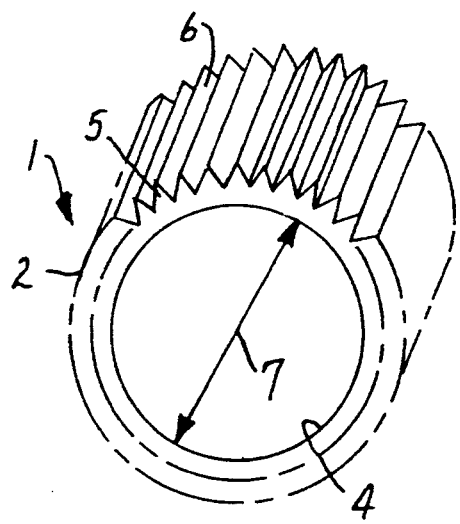
FIG. 5 is an end cross-sectional view of the conventional light conduit with parallel grooves illustrating the behavior of light rays within the light conduit.
Figure 6:
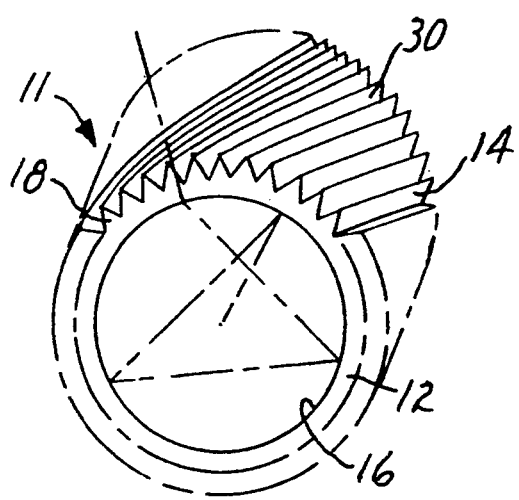
FIG. 6 is an end cross-sectional view of the light conduit with spiralled grooves illustrating the behavior of light rays within the light conduit.

Referring to FIG. 5, a cross-section of optical lighting film light conduit 1 with grooves parallel to longitudinal axis 7 of the light conduit is shown. Light rays which start from or pass through longitudinal axis 7 of light conduit 1 will travel on a plane passing through longitudinal axis 7 of light conduit 1 for the length of the light conduit. On the other hand, as shown in FIG. 6, light rays which start from or pass through longitudinal axis 22 of light conduit 11, light conduit 11 having grooves disposed in a helical orientation with respect to longitudinal axis 22, will reflect from the linear array of prisms and travel along a non-planar path down light conduit 11, increasing the rate the light rays leak out of the tube. The light rays will travel along a plane which spirals in the same rotational direction as the rotational direction of the prismatic facets. The points at which the light ray intersects wall member 12 within the light conduit will spiral, however, in a direction rotationally counter to the direction that grooves 30 spiral.

Figure 8:
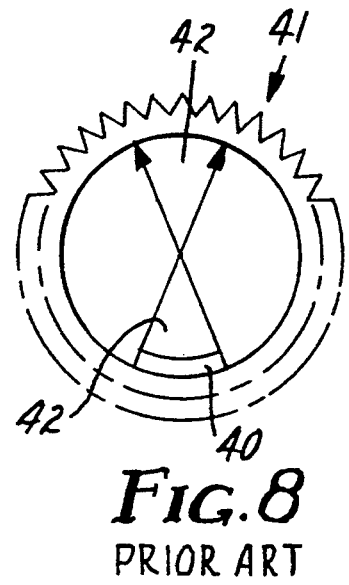
FIG. 8 is an end cross-sectional view of a conventional light conduit with parallel grooves and a diffuse scatterer placed on the interior wall of the light conduit.
Figure 7:
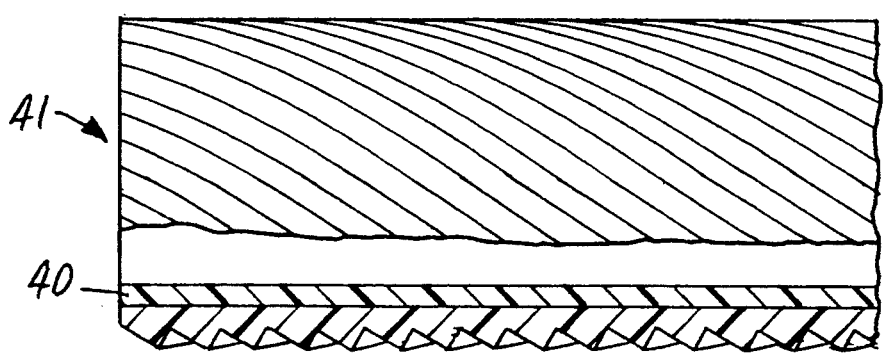
FIG. 7 is a side view of the light conduit with a diffuse scatterer placed on the interior wall of the light conduit.

Besides the transmission of light from the light conduit, the "spiralling" of the light rays also may be used for other purposes. For example, a light conduit with grooves disposed in a helical orientation may be used in conjunction with an extractor, such as a diffuse reflective scattering layer internal to the light conduit, to increase light emission from the light conduit. In FIG. 7, diffuse scatterer 40 is placed internal to light conduit 41. If the grooves on the light conduit are disposed in a parallel orientation to the longitudinal axis of the light conduit, then when light rays strike diffuse scatterer 40, they are diffusely scattered, thereby increasing the intensity of the light emitted by light conduit 41. Although diffuse scatterer 40 increases the intensity of light emitted, it removes light from the angular regions associated with it within the light conduit interior, as shown in FIG. 8. The depletion of angular regions occurs as planes of light are removed by diffuse scatterer 40 and planes of light from other regions of light conduit 41 never interact, or only interact weakly, with diffuse scatterer 40, as they continue to reflect along a plane through the axis of the light conduit. Depleted zones 42 are created in the angular regions in which light has been removed because of diffuse scatterer 40. Therefore, as the length of light conduit 41 increases, in other words, lengthening the aspect ratio of the light conduit, the effectiveness of diffuse scatterer 40 decreases because there is less light available to diffuse scatter 40 in depleted zones 42 where diffuse scatterer 40 is located.

Placing the grooves in a helical orientation with respect to the longitudinal axis of a light conduit allows light rays from angular regions not associated with diffuse scatterer 40 to replenish light in depleted zones 42. The replenishment of depleted zones 42 is possible with spiralled grooves because light rays do not travel along a plane crossing through the axis of the light conduit as light rays do in a light conduit with parallel grooves. Light rays that would otherwise travel along a plane crossing through the axis of the light conduit, thereby never coming in contact with diffuse scatterer 40 in a parallel groove situation, will now travel along rotating planes, rotating in a helical fashion, such that the light rays will now travel into all angular regions, including those angular regions associated with diffuse scatterer 40, i.e. the depleted zones 42. Therefore, spiralling the grooves allows a light conduit to have longer aspect ratios while maintaining the intensity of the light emitted by the light conduit along the entire length of the light conduit because more light is made available to the diffuse scatterer along the entire length of the light conduit.

Figure 9:
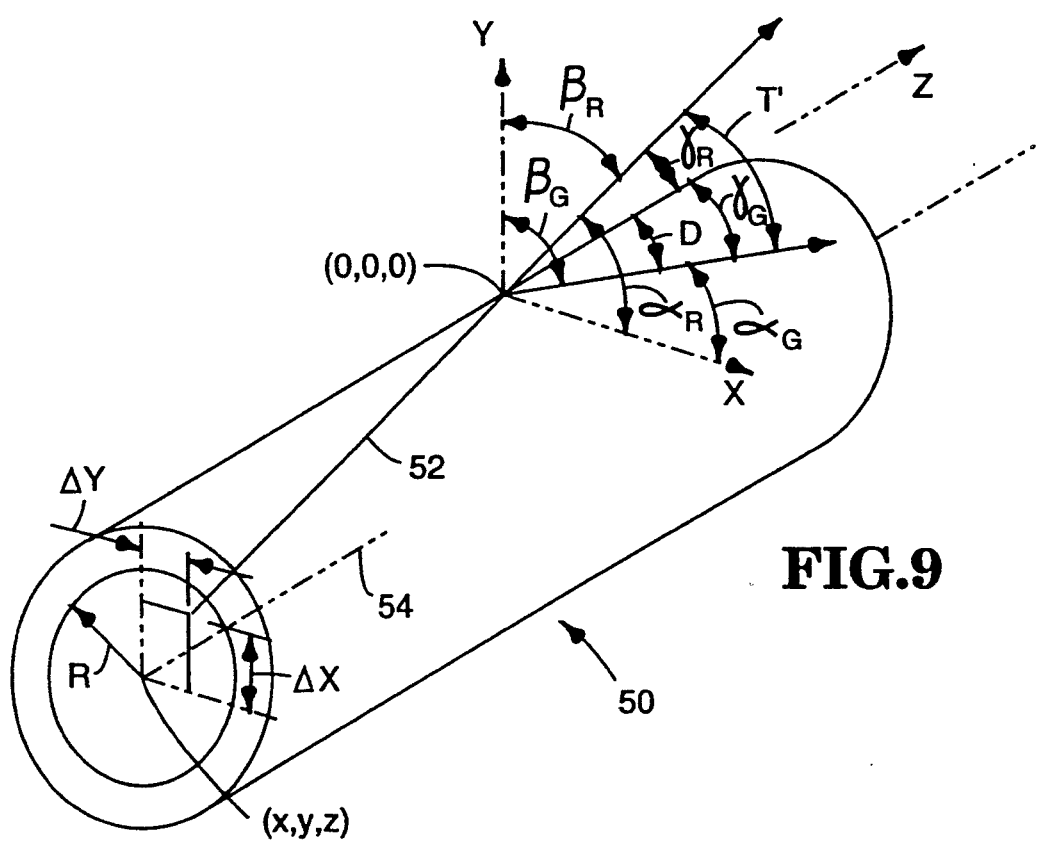
FIG. 9 is a perspective view of a schematic representation of the light conduit to illustrate light ray and groove geometry for light rays originating off the longitudinal axis of the light conduit.

The aforementioned analysis of light rays within a light conduit with spiralled optical lighting film relates only to light rays that originate from a light source on the longitudinal axis of the light conduit. Light rays that originate from a point off the longitudinal axis of the light conduit will approach the interior wall of the light conduit at an angle $T'$ with respect to the longitudinal axis of the light conduit or the interior wall, as shown in FIG. 9. Angle $T'$ may be determined by the following equation:

$$\cos(T') = \cos\alpha_R \cos\alpha_G + \cos\beta_R \cos\beta_G + \cos\gamma_R \cos\gamma_G$$

where $\alpha_R$, $\beta_R$, and $\gamma_R$ are the angles that the light ray makes with a local x-axis, y-axis and z-axis, and where $\cos(\alpha_R)$, $\cos(\beta_R)$, and $\cos(\gamma_R)$ are the direction cosines that the light ray makes with a local coordinate system, where the local coordinate system is set up with the z-axis parallel to the light conduit longitudinal axis, the y-axis perpendicular to the surface of the light conduit at the point where the light ray intersects the light conduit surface and the x-axis is tangent to the surface at the light ray intersection point, and thus perpendicular to the y-z plane and $\alpha_G$, $\beta_G$, and $\gamma_G$ are the angles that the groove, as defined by angle D, makes with the local coordinate system, and where $\cos(\alpha_G)$, $\cos(\beta_G)$, and $\cos(\gamma_G)$ are the direction cosines that the groove makes with the local coordinate system, as shown in FIG. 9.

In FIG. 9, light ray 52 is originating from a point off longitudinal axis 54 of light conduit 50. In a specific case, light would originate from a point at the end of the light conduit on longitudinal axis 54 of the light conduit, at point (x, y, z). In a more general case, however, light ray 52 may originate from a point displaced from the point on axis 54 and instead originating at displaced point $(x - \Delta x, y - \Delta y, z - \Delta z)$. In this more general case, angle $T'$ may be determined from the following equation:

$$\cos(T') = \frac{x - \Delta x}{r_S} \cos\alpha_G +$$

$$\frac{y - \Delta y}{r_S} \cos\alpha_G + \frac{z - \Delta z}{r_S} \cos\alpha_G$$

where $r_S$ is the distance from $(x - \Delta x, y - \Delta y, z - \Delta z)$, the point of origination of light ray 52, to the point of intersection of light ray 52 and the light conduit wall, and may be determined by the following equation:

$$r_S = [(x - \Delta x)^2 + (y - \Delta y)^2 + (z - \Delta z)^2]^{\frac{1}{2}}$$

which reduces to:

$$\cos(T') = \frac{x - \Delta x}{r_S} \sin D + \frac{z}{r_S} \cos D$$

because:

$\cos(\beta_G) = 0$;

$\beta_G = 90°$ because the groove will always lie in the x-z plane as the local coordinate system is defined;

$\gamma_G = D$;

$\Delta z = 0$;

assuming z is chosen to be the z-distance that the light ray originates from the local coordinate system; and $\cos(\gamma_G) = \sin D$.

Using this equation, angle $T'$ may be determined for any light ray, originating on or off longitudinal axis 54 of the light conduit. For light rays originating on longitudinal axis 54, $\alpha_R = \beta_R = 90°$. Thus, $\cos(\alpha_R) = \cos(\beta_R) = 0$, dropping the first two terms from the general equation, leaving the original equation $\cos(T') = \cos(\gamma_R)\cos(\gamma_G)$, where $\gamma_R = T$ and $\gamma_G = D$. For any light ray originating off longitudinal axis 54 of the light conduit, the general formula can be used. For example, for a light conduit with a radius, R, and with a displacement angle for the spiralled grooves of five degrees (D=5°), the following table will describe the value of $T'$ for different origination locations of light rays:

| Δx | Δy | T' (degrees) |
| --- | --- | --- |
| 1/2 R | 0 | 22.6 |
| −1/2 R | 0 | 18.3 |
| 0 | 1/2 R | 10.5 |
| 0 | −1/2 R | 26.4 |
| 0 | −3/4 R | 30.0 |
| 0 | 0 | 18.7 |

If T' is greater than 27.3 degrees, then light is extracted from the light conduit. Therefore, for a five degree spiral and an extended light source, even though light rays that originate on longitudinal axis 54 are totally internally reflected, as are light rays that emanate from some points along the extended source, it still is possible to find other light rays from the extended source that exceed the critical angle and thus are extracted from the light conduit at a particular point on the light conduit wall, as shown by a light ray originating from a point (x, y−(−¾ R), z).

Figure 10:
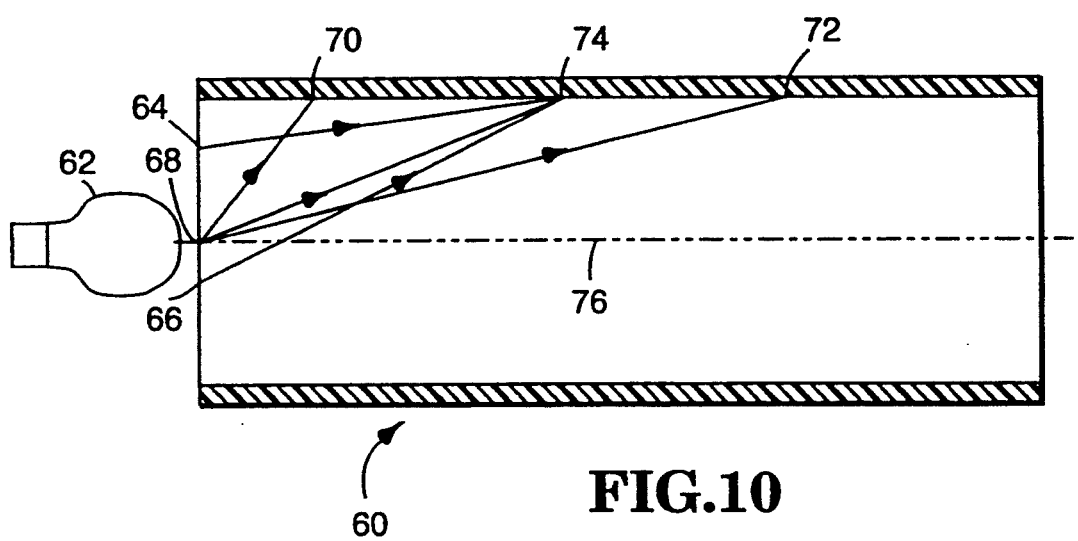
FIG. 10 is a side cross-sectional view of a schematic representation of the light conduit with an extended light source illustrating the range of angles that light rays emanate from an extended light source.

It is recognized that the analysis for the general case, where the light rays may originate from both on and off axis points of a light source, the analysis for the entrance ray angle T' is limited to a given point on the light conduit where the light rays approaches the wall of the light conduit. It is further recognized that for a given light source, light rays may emanate to a range of angles, and the same analysis can be completed for the range of angles at each point of intersection with the light conduit wall. For example, in FIG. 10, light conduit 60 transports and extracts light emanating from light source 62. Light source 62 is an extended light source, with light rays originating from points on longitudinal axis 76 of light conduit 60, such as light rays originating from point 68, as well as points off longitudinal axis 76, such as origination point 64 and origination point 66. Further, light rays emanating from light source 62 emanate to a range of angles and each light ray could be analyzed for its entrance ray angle T' for a particular point on the light conduit wall. For example, light rays emanating from origination point 68 may emanate to a range of angles and strike many points along light conduit 60, such as intersection point 70, point 72 and point 74. The analysis of the entrance ray angle T' may be performed for any selected point where a light ray approaches the wall of the light conduit, as well as for light rays emanating from any point from an extended light source.

Although a preferred embodiment has been illustrated and described for the present invention, it will be appreciated by those of ordinary skill in the art that any apparatus which is calculated to achieve the same purpose may be substituted for the specific configuration shown. This application is intended to cover any adaptations or variations of the present invention. Therefore, it is manifestly intended that this invention be limited only by the appended claims and the equivalents thereof.

What is claimed is:

1. A longitudinal, hollow light conduit having a longitudinal axis, said light conduit for transporting light there along and distributing light therefrom, comprising a wall member of a transparent material, said wall member including a structured surface on one side and a smooth surface opposite said structured surface, said structured surface having a linear array of substantially right angled isosceles prisms arranged side-by-side, said linear array of substantially fight angled isosceles prisms disposed in a non-parallel orientation and at an angle of greater than zero and less than or equal to ten degrees with respect to said longitudinal axis.

2. The light conduit according to claim 1, wherein said hollow light conduit is in tubular form and at least a portion of said wall member lies in a smooth arcuate curve.

3. The light conduit according to claim 2, wherein said linear array of substantially right angled isosceles prisms are disposed in a substantially helical orientation with respect to said longitudinal axis.

4. The light conduit according to claim 1, wherein said transparent material is a polymeric material.

5. The light conduit according to claim 1, further comprising light extraction means for increasing the portion of light which is extracted from said light conduit.

6. The light conduit according to claim 5, wherein said light extraction means comprises a diffuse scatterer placed on said smooth surface of said wall member.

7. A hollow, tubular light conduit having a longitudinal axis, said light conduit for transporting light there along and distributing light therefrom, comprising a wall member of a transparent material, said wall member substantially circular in a cross-section and including a structured surface on one side and a smooth surface opposite said structured surface, said structured surface having a linear array of substantially right angled isosceles prisms arranged side-by-side, said linear array of substantially right angled isosceles prisms disposed in a substantially helical orientation and at an angle of greater than zero and less than or equal to ten degrees with respect to said longitudinal axis.

* * * * *